US006691155B2

United States Patent
Gottfried

(12) United States Patent
(10) Patent No.: US 6,691,155 B2
(45) Date of Patent: Feb. 10, 2004

(54) MULTIMEDIA SYSTEM FOR SHARING BRAND INFORMATION KEEPS HISTORY OF MODIFICATIONS OF PRODUCTION INFORMATION BY CONSUMERS TO ALLOW RECREATING MULTIMEDIA INTERFACE IN ITS PREVIOUS FORMATS

(76) Inventor: Linda Gottfried, 35 Marquette Rd., Montclair, NJ (US) 07043

( * ) Notice: Subject to any disclaimer, the term of this patent is extended or adjusted under 35 U.S.C. 154(b) by 0 days.

(21) Appl. No.: 10/176,437

(22) Filed: Jun. 20, 2002

(65) Prior Publication Data

US 2003/0236834 A1 Dec. 25, 2003

(51) Int. Cl.⁷ .............................................. G06F 15/15
(52) U.S. Cl. ........................ 709/204; 709/224; 709/246
(58) Field of Search ................................ 709/204, 206, 709/224, 246; 705/27, 14; 707/7, 10

(56) References Cited

U.S. PATENT DOCUMENTS

| | | | |
|---|---|---|---|
| 5,625,763 A | 4/1997 | Cirne ........................... 395/133 |
| 5,835,088 A | 11/1998 | Jaaskelainen, Jr. ........... 345/343 |
| 5,854,893 A | 12/1998 | Ludwig et al. ......... 395/200.34 |
| 5,916,302 A | 6/1999 | Dunn et al. .................. 709/204 |
| 5,949,414 A | 9/1999 | Namikata et al. ............ 345/332 |
| 6,025,871 A | 2/2000 | Kantor et al. .................. 348/15 |
| 6,075,571 A | 6/2000 | Kuthyar et al. .............. 348/584 |
| 6,125,115 A | 9/2000 | Smits .......................... 370/389 |
| 6,167,432 A | 12/2000 | Jiang ........................... 709/204 |
| 6,195,091 B1 | 2/2001 | Harple et al. ................ 345/330 |
| 6,201,859 B1 | 3/2001 | Memhard et al. ......... 379/93.21 |
| 6,256,663 B1 * | 7/2001 | Davis ........................... 709/204 |
| 6,298,348 B1 * | 10/2001 | Eldering ....................... 707/10 |
| 6,304,283 B1 | 10/2001 | Kitagawa ................. 348/14.06 |
| 6,317,777 B1 | 11/2001 | Skarbo et al. ............... 709/204 |
| 6,323,894 B1 | 11/2001 | Katz ............................. 348/15 |
| 6,338,044 B1 | 1/2002 | Cook et al. ................... 705/14 |
| 6,405,175 B1 * | 6/2002 | Ng ............................... 705/14 |
| 6,411,965 B2 * | 6/2002 | Klug ........................... 707/201 |
| 6,490,614 B1 * | 12/2002 | Shaffer et al. .............. 709/206 |
| 2001/0007332 A1 | 7/2001 | Kjonaas et al. ............. 235/379 |
| 2001/0027410 A1 | 10/2001 | Ueda ........................... 705/10 |

(List continued on next page.)

OTHER PUBLICATIONS

M. Sohlenkamp and G. Chwelos "Integrating Communication, Cooperation, and Awareness: The DIVA Virtual Office Environment", *ACM*, Oct. 1994, 331–343.

D. Kirovski et al., "Hypermedi–Aided Design", *ACM*, Jun. 2001, 407–412.

*Primary Examiner*—Le Hien Luu
(74) *Attorney, Agent, or Firm*—Ernest D. Buff & Associates, LLC; Ernest D. Buff; Charie Ann Sherman

(57) ABSTRACT

An interactive, computer network based system presents consumers with multimedia brand information via a browser-based interface called the GraffitiWall™. Consumers can use the GraffitiWall™ to modify and display a sponsor's brand information in any way desired. Consumer modifications are immediately communicated to the other member consumers and the advertiser/sponsor. Consumers can rate the GraffitiWall™, or portions thereof, and email the GraffitiWall™. An archive of GraffitiWalls™ is maintained by the system. Consumers participate in online focus groups, one-to-one interviews and discussions, as well as games and promotions pertaining to the brand. Interaction with consumers through focus groups, one-to-one interviews, discussions, games and promotions allows the hosting company to reinforce brand equities; speak directly to their target audience; test new and updated products and services; and encourage participation to a brand via purchases and signups by rewarding the participant with coupons, samples, gift certificates, and the like. An ongoing dialogue between business and consumer, as well as consumer-to-consumer, nurtures customer participation, loyalty and satisfaction, and builds a community housed within the company's brand.

50 Claims, 2 Drawing Sheets

U.S. PATENT DOCUMENTS

| | | |
|---|---|---|
| 2001/0034664 A1 | 10/2001 | Brunson ........................ 705/26 |
| 2001/0038033 A1 | 11/2001 | Habib ......................... 235/375 |
| 2001/0039519 A1 * | 11/2001 | Richards ....................... 705/27 |
| 2001/0049625 A1 * | 12/2001 | Mowry ......................... 705/14 |
| 2001/0056395 A1 | 12/2001 | Khan ........................... 705/37 |
| 2002/0049812 A1 * | 4/2002 | Nahon ......................... 709/204 |
| 2002/0073151 A1 * | 6/2002 | Rogers et al. .............. 709/204 |
| 2002/0161764 A1 * | 10/2002 | Sharo ........................... 707/7 |

* cited by examiner

MULTIMEDIA SYSTEM FOR SHARING BRAND INFORMATION KEEPS HISTORY OF MODIFICATIONS OF PRODUCTION INFORMATION BY CONSUMERS TO ALLOW RECREATING MULTIMEDIA INTERFACE IN ITS PREVIOUS FORMATS

BACKGROUND OF THE INVENTION

1. Field of the Invention

The present invention relates to a web-based information sharing system; and more particularly, to a computer interface enabling companies and consumers to share brand information over the World Wide Web.

2. Description of the Prior Art

Advertising offers value to the consumer by introducing the consumer to new products, about which the consumer would not otherwise be informed. At times, these may even be essential products that substantially benefit the consumer's health, finances, and quality of life. Notably, over the past fifty years, the nature of advertising has been evolving to reflect the increasing sophistication and technological innovation characteristic of today's media. To a certain extent, today, advertising can even be characterized as an art form. Advertising has become more pervasive and the consumer's acceptance of advertising has increased.

One recent advertising development is the use of movies as a medium for brand reinforcement. For example, the popular movie, "E.T." shows a character clearly eating Hershey's Reese's Pieces®, rather than a generic chocolate candy. Characters in the movie, "The Client", reach for clearly labeled soda products to calm themselves. The movie, the "Matrix" features telephones identifiable as Nokia® brand. Consumers seem to accept this form of advertising, as adding realism to the story a movie has to tell, as long as it doesn't involve potentially harmful products such as alcohol or cigarettes. In addition, consumers gladly purchase memorabilia related to movies and television shows such as Mickey Mouse watches, E.T. dolls, and Spiderman costumes, which are in and of themselves, a form of advertising. Consumers have adopted advertisements as status goods so that the line between advertisement and product has become blurred.

Most recently, the World Wide Web (Web) has become an additional medium for brand reinforcement. However, studies show that pop-up ads and banner ads, along with unsolicited email, annoy consumers and may provide limited benefit to the advertising companies. Consumers are ready for a method of interacting creatively with brand information, particularly graphical information, over the Web and advertisers are equally anxious for the instant consumer feedback the Web can provide. Advances in software and hardware, as well as an increase in available bandwidth, now make this feasible. In addition, consumers seem to welcome using the Web as a means to share their evaluation of products whether through the form of book reviews on www.amazon.com® or product evaluations on a wide variety of sites. The prior art describes some attempts to use the Web for sharing information.

Video conferencing was an early attempt to enable users to interact and share documents over the Web. Collaborative video conferencing software currently exists which enables individuals, located at physically dispersed locations, to view the same data over the Web and to modify it. For example, U.S. Pat. No. 6,317,777 B1 to Skarbo et al., entitled "Method for Web Based Storage and Retrieval of Documents," describes a method by which a presenter can share a file with other conference attendees and update the shared document with the changes made to the document during the conference sharing. A document server incorporates a revision control system to allow a history of the documents to be maintained on the server. The server can present a list of current document versions as well as previous versions, thereby allowing the attendees to review the document in all its previous forms.

Also known in the art are networked systems, which enable conference attendees to create or modify information and to share it over the Web. For example, attendees can draw on a whiteboard accessible to all the attendees, using standard geometric shapes such as lines and circles. The attendees can exchange not only text files but also, video, audio, and graphics files. Further, the attendees can communicate via a chat function, which is a real-time, interactive, textual based conference tool that allows attendees to post messages to each other in a shared area. Such a system is described in U.S. Pat. No. 6,195,091 B1 to Harple et al. entitled "Apparatus for Collaborative Computing."

More recently, focus groups, which are discussions that enable marketers to acquire feedback from a group of participants regarding new products, are being conducted over the Web. U.S. Pat. No. 6,256,663 to Davis entitled "System and Method for Conducting Focus Groups Using Remotely Loaded Participants Over a Computer Network" describes how a chat function can be used to implement a focus group. In the described system, the focus group members, the group moderator, and the client presenting the new product are all located remotely from each other and communicate via the Web. The focus group members can view the messages each member transmits but cannot view the messages the client and moderator transmit to each other.

Consumers are now ready for an online environment in which they can creatively express and communicate their feelings about products as members of a virtual community. Specifically, what the prior art does not provide is a computer network based system that enables the consumer to modify brand information in a way that instantly reflects the consumer's thoughts, wishes, and desires for what the brand should be, and also rewards the consumer for the consumer's efforts. Also needed is a computer network based environment for immediately communicating the consumer's input to both other consumers and the advertiser. Further needed is the ability to easily adapt this system to any brand desired.

SUMMARY OF THE INVENTION

The present invention provides a computer network based system and method whereby consumers can interact with brand information and with each other. The invention is implemented over the Web, an intranet, or other network system. Consumers interact with a server, or a plurality of servers, in client server mode, using a standard browser, such as Microsoft Explorer or Netscape Navigator. Each consumer registers as a member and receives an identifying username (handle).

The consumer interacts with a multimedia interface known as the GraffitiWall™, which offers several different types of interaction. In Create Mode, the advertising sponsor or sponsors provide the consumer with a variety of multimedia elements such as audio files, video clips, icons, text, and photographs, which the consumer can place on a virtual Wall™, (GraffitiWall™), in any way the consumer desires. The elements include information pertaining to the brand, for example, a picture of a bathing suit being offered for sale or being considered for sale as a new product. Elements that the consumer places on the Wall may appear continually or may pop up only when a visitor to the Wall places the visitor's mouse over a particular object. Consumers can also upload their own objects and place them on the Wall. Consumers are supplied with tools such as a virtual paintbrush, a rotator, and an animator, for example, which a consumer can use to modify any of the objects. The GraffitiWall™ is refreshed periodically so that updates by the individual consumers can be shared.

The consumer can also interact with the GraffitiWall™ in Rate Mode. Consumers can vote on either the entire GraffitiWall™ or a particular are of the Wall. This enables the advertiser to immediately determine what the consumers like and dislike about the brand.

The consumer can also interact with the GraffitiWall™ in Interact Mode. A sponsor places images of new products or new concepts on the Wall for the consumer to review, sample, and rate. The sponsor has control over all information that the consumer sees, and can tailor that information to each individual user. Consumers involved in the rating activity comprise a virtual focus group composed of a plurality of one-to-one interviews and group discussions with the sponsor. The sponsor rewards consumer participants with coupons, samples or other perquisites related to the sponsor's brand. GraffitiWall™ provides a feedback tool where sponsors can directly communicate with their audience through multimedia.

Interact Mode is also enhanced by guest hosting. The GraffitiWall™ features a celebrity host, who is available to communicate real time with the consumer through a chat. The host interacts with the consumer by inviting the consumer to compete in a special event. For example, a super model host might invite the consumer to participate in a fashion show in which the consumer competes to create the best-dressed model. An image of the super model appears on the GraffitiWall™ along with the samples of the sponsor's merchandise and the consumer manipulates these elements as the consumer wishes. Not only does this activity create brand excitement and familiarize the consumer with the product available, but also, the sponsor can instantly understand what the consumer deems to be most attractive. An archive of favorite GraffitiWall™ sessions, focus groups and events is available for consumers to review.

The consumer can also interact with the GraffitiWall™ in Send Mode. The consumer can email a hyperlink to a specific GraffitiWall™, in postcard format, to friends and family or to the sponsoring company.

The consumer can also interact with the GraffitiWall™ to participate in special events or games. For example, the GraffitiWall™ may present the consumer with a scavenger hunt interface. The GraffitiWall™ is loaded with many different images and the consumer is presented with clues, which will lead the consumer to locate and uncover surprises related to the sponsored brand, such as images of hidden products.

To attract consumer attention, the GraffitiWall™ also features random events and silly animations. These can include, for example, parades, roller bladders gliding by, or animations of famous dancers.

Among the significant benefits accorded by the GrafittiWall™ are certain enablement and facilitation features, which allows companies to: (i) reinforce their brand equities; (ii) speak directly to their target audience on an ongoing basis; (iii) test new and updated products and services via the Focus Group/Feedback mode; (iv) create an environment, which builds greater customer satisfaction and involvement; (v) build brand communication so customers see and feel the brand as his/her own; and (vi) encourage participation to a brand via purchases and signups by rewarding folks with coupons, samples, and gift certificates. Customers are enabled to express product preferences in a free-form mode using the web based GrafittiWall™ system, which dynamically stores customer inputs and updates it to other users. An ongoing dialogue between business and consumer, as well as consumer-to-consumer, nurtures customer participation, loyalty and satisfaction, and builds a community housed within the company's brand. The end results spell greater profits and keep companies on the radar; first and foremost in the minds of their customers.

BRIEF DESCRIPTION OF THE DRAWINGS

The invention will be more fully understood and further advantages will become apparent when reference is had to the following detailed description and the accompanying drawings, in which.

DESCRIPTION OF THE PREFERRED EMBODIMENTS

Figure 1:
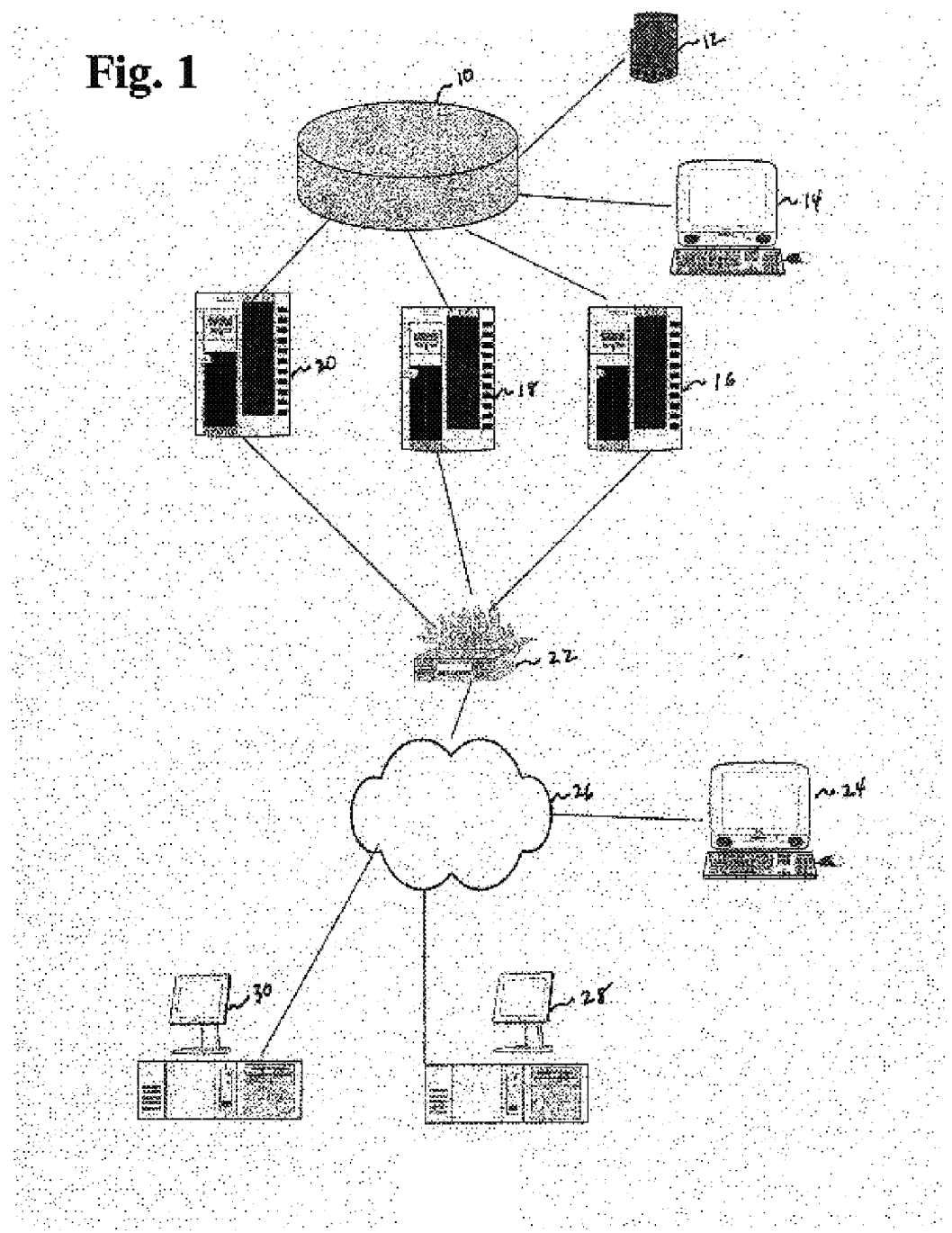
FIG. 1 is a block diagram illustrating the functional components of a system on which the present invention can be implemented.

FIG. 1 shows example hardware for the present system. The database server 10, stores the entire historical state of the GraffitiWall™, the brand information used to create the Wall, the Graffiti added by consumers, consumer demographic information, and survey and Focus Group/Feedback data provided by the consumers. Information stored in the database server 10 may take the form of tables comprising a relational database, for example. The database server 10 is connected to a plurality of product information servers 16, 18, 20. To support scaling, multiple product information servers 16, 18, 20 can serve visitors to a single GraffitiWall™. The product information servers 16, 18, 20 interact with the database server 10 on behalf of the consumer workstations 28, 30 to minimize the load on the database server 10 by caching information. There may be any number of servers 16, 18, 20 or the servers 16, 18, 20 can be eliminated, in which case the database server 10 is directly connected to the firewall 22. There may also be more than one database server 10 and any number of consumer workstations 28, 30. The product information servers 16, 18, 20 are augmented standard Web servers and handle the following types of requests: retrieve page (standard HTML); retrieve Wall section (by area and time); add/update graffiti; return Wall snapshot; retrieve chat; send chat message; add user; validate user; update user; update user demographics; and update user survey.

The firewall 22 insulates the database server 10 from the Internet 26. The database server 10 can also be connected to a personal digital assistant (PDA) 12 or other portable device. A system administration workstation 14 is connected to the database server 10 for managing the database server 10. A plurality of consumer workstations 28, 30 communicate with the database server 10 and the product information servers 16, 18, 20 via the Internet 26 and the firewall 22. A sponsor workstation 24 communicates with the database server 10 in the same manner as the consumer workstations described above. The system may also be implemented in an intranet environment as is well known in the art. Also, any consumer workstation 28, 30 can function as a kiosk connected over an intranet to the database server 10.

The consumer workstations 28, 30 use standard browser software, such as Microsoft's Internet Explorer®, to communicate with the database server 10. GraffitiWall™ Visitor Software can be provided to the consumer workstations 28, 30 in the form of an ActiveX control Java Applet or Shockwave Movie, for example. Images are stored as vector graphics using Flash® or similar technologies. The GraffitiWall™ Visitor Software will receive and supply data to the product information servers 16, 18, 20 using the HTML and XML over HTTP standard protocols. The GraffitiWall™ Visitor Software can be run either as an Active Server Page, on behalf of sponsors, or it can be delivered to sponsors as a software product, which the sponsors can run on their own server infrastructure. The Visitor Software supports segmenting consumers into demographic or other groups, based upon information stored in the database server 10, such that the GraffitiWall™ and other content displayed can be customized for specific groups and certain sections of the GraffitiWall™ are visible only to members of specific groups.

Graffiti created by consumers is stored as a series of instructions, or opcodes, that manipulate the GraffitiWall™. An example of an opcode might be "color all pixels black in the first line of the Wall." The use of opcodes enables the system to display any version of the Wall, and the process of constructing it, at any time and as many times as desired. The relational database stored on the database server 10 contains a record of each media object created, its position, the user who created it, and the GraffitiWall™ it was created on. Accordingly, it is not necessary to store multiple copies of the GraffitiWall™, but rather, only time stamped modifications to the Wall. The consumer can easily email a "snapshot" of the Wall, taken at any time, as the Wall history is maintained on the database server 10.

The system administration workstation 14 is equipped with Administrative Control Panel (ACP), browser-based software that enables an administrator to maintain the GraffitiWall™ by adding and deleting information as necessary, to update the Wall to reflect consumer input, and to produce reports of consumer activity on the Wall. The GraffitiWall™ refreshes at least once a day. Also, through the ACP, new GraffitiWalls™ can be created with the appropriate text, media, and options for any brand or client. The ACP also provides for the creation and scheduling of focus groups and the viewing of feedback data. Maintenance functions provided by the ACP include removal of undesirable consumers and undesirable Graffiti. The ACP also provides for answering consumer questions and other real-time consumer support through chats and email. Options such as limiting the size of the GraffitiWall™, which by default is larger than standard screen size, (740×540 pixels), determining which images a consumer can manipulate, and setting the time period for which Graffiti will remain on the Wall before expiring are also controlled through the ACP. The ACP enables a sponsor to manage mailing lists of Wall users and to send email to all Wall members, or subsets of members, based on demographic criteria.

The system provides a subset of the ACP, the Client Control Panel (CCP) 24 software, for each sponsor workstation 14. The CCP 24 software is designed for less expert users and provides less functionality. This software enables the sponsor to configure the GraffitiWall™ and to receive reports.

Figure 2:
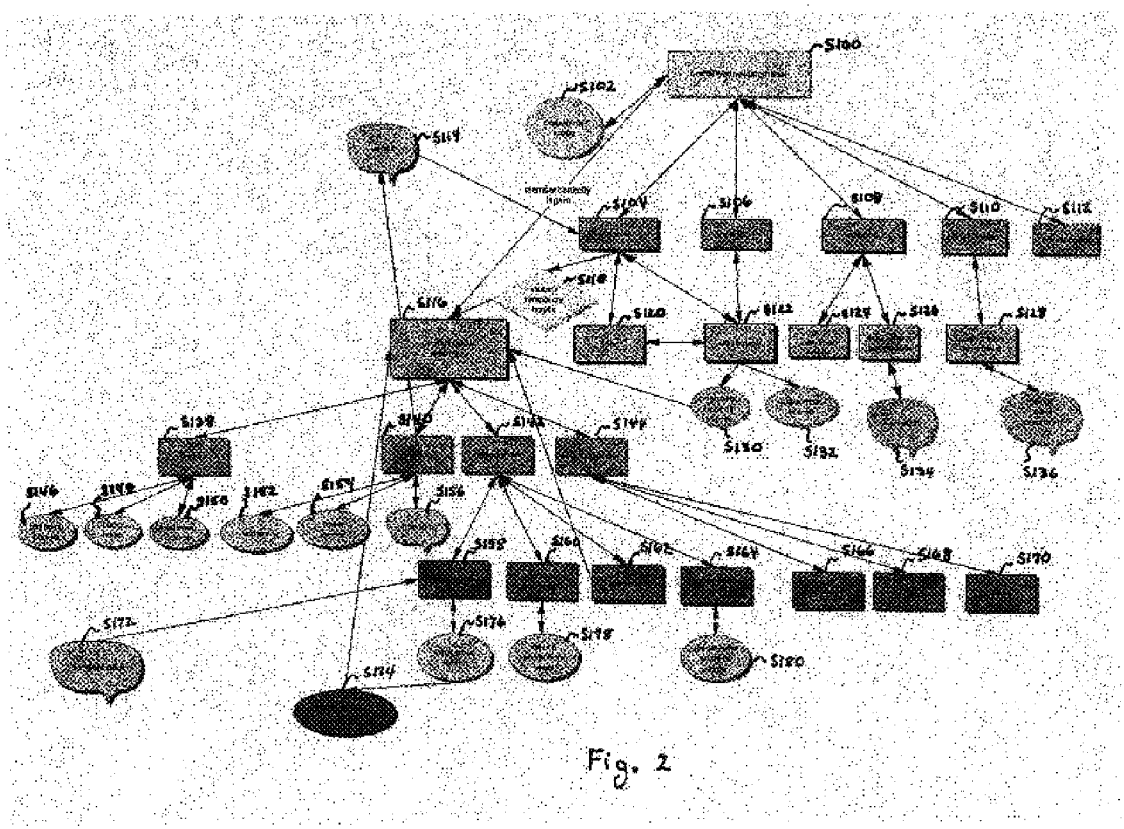
FIG. 2 is a flow diagram depicting the operation of the present invention.

FIG. 2, explains the step-by-step operation of the invention described above. In step S100, the consumer's browser displays a splash page, which welcomes the consumer to the GraffitiWall™. In Step S104, new visitors to the GraffitiWall™ can take an online tour of the GraffitiWall™ website. If the visiting consumer is interested in using the GraffitiWall™, the consumer proceeds to step S118 to obtain a temporary user name, (handle), and password and can then view the Graffiti Main Menu in step S116. A visitor handle only enables a consumer to create graffiti for a one-week trial period and the consumer cannot participate in focus groups, scavenger hunts, sales and promotions, and guest host programs.

Members of the GraffitiWall™ proceed directly to view the Graffiti Main Menu in step S116; membership is free. If there is a login error, the member is presented with an error message in step S102. If the member's username is invalid, the consumer is directed to step 122 to sign up. If the password is invalid, the consumer is emailed a valid password. If the consumer does not enter a valid username and password within a preset time period, the consumer is directed to step 122 to sign up. A consumer can also proceed to step S106 to learn about the benefits of joining the Wall and then onto step S122 to become a member of the GraffitiWall™.

The visitor can also go to step 106 and sign up for full membership. The user would get a temporary handle and the system would send this member an email after completing a membership database search. This approach minimizes abuse, since some users may wish to sign up with multiple accounts. Before sending a confirmation email, the database compares each new member's information with a database containing current contact information, emails and names. If the comparison actuates a red flag, an email is sent, notifying the user of the result. When the search results are clean, a confirmation email is sent. The confirmation welcomes the new member and lists the member's username and password. Each user is instructed to link to the site by means of the hot link embedded within the email. Through this means, the user is brought into a logged in, new member area.

The consumer selects a user name and password and completes a demographic and general interest information form. If there are any errors in the signup procedure, the consumer receives an error message in step S132. The consumer's information is stored on the database server FIG. 1 reference numeral 10. After successful login, the user proceeds to step S130 to view a successful login pop up message and then proceeds to step S116, to view the GraffitiWall™ Main Menu.

The consumer may also proceed to step S108, from the splash page, to learn about the company providing the GraffitiWall™. In step S108, the consumer can review member benefits, partner benefits, information about staff and employment opportunities, receive customer service, and review a list of frequently asked questions (FAQs). In step S124 and step 126, the consumer can email, respectively, the customer service department or the human resources department of the GraffitiWall™. Alternatively, the consumer may proceed to step S110 to review the advertising opportunities available on the GraffitiWall™ and to contact the GraffitiWall™ sales force, in step S136. The consumer may also proceed to step S112 to review the privacy policy.

When the consumer reaches the GraffitiWall™ Main Menu, at step S116, a chat immediately becomes available. The consumer's handle appears in the chat window and subsequently, on any graffiti the consumer creates. The consumer has a choice of proceeding to step S138, Create Mode, step S140, Rate Mode, step S142, Interact Mode, or step S144, Help Mode. In Create Mode, the consumer can select graphic media elements in step S146 or audio media elements, in step S148 and drag these onto the GraffitiWall. The graphic media, besides including a standard selection of photographs and icons, also includes pictures of the sponsor's products. Using the Tools menu in step S150, the consumer can modify and annotate the graphics and audio in any way the consumer desires and the company allows.

For example, a sponsor can provide a bathing suit graphic picturing a new style of suit. The consumer can use the Tools to adjust the color, pattern, and shape of the bathing suit. The sponsor determines the type and degree of modification the consumer can effect. The consumer can also apply the bathing suit to a graphic of model, attach a musical riff to the dressed model, or even decorate an environment populated with the sponsor's products and logos.

As another example, a consumer can upload photographs of the consumer's house or garden. The consumer can then place the sponsor's products within the consumer's virtual home and limit entrance to the virtual home to specific members of the GraffitiWall™.

In Rate Mode, the consumer can proceed to step S154 and rate either the entire GraffitiWall™ or a particular area of the Wall. When a consumer rates a wall, the system takes a snapshot of the wall and records it, along with the consumer's vote, on the database server FIG. 1 reference numeral 10. Walls that receive high ratings are placed in the archive in step S152 so that members can view them.

In step S114, a consumer can email a snapshot of the wall along with a personal note. The snapshot or e-postcard contains a unique Uniform Resource Locator (URL) where the recipient can view the GraffitiWall™ of interest. In step S156, the consumer can contact the GraffitiWall™ sponsor via email. The email form provides a pull down menu, populated with topics the consumer can select from. This enables the system to route the emails by subject so the customer service department can respond more quickly. A text form enables members to contribute suggestions. If a suggestion is integrated into the GraffitiWall™, the suggester is rewarded with a coupon or promotional products and the suggester's handle is posted on the GraffitiWall™.

If the consumer proceeds to step S148, Interact Mode, the consumer can select from Focus Groups in step S158, Sales and Promotional Events in step S160, Guest Hosting in step S162, or Games, in step S164. Some focus groups are open to the full membership while others are only open to targeted groups or targeted individuals. The sponsor can reach a selected audience by emailing the potential participant a hyperlink to a logged-in area of the focus group session, or by placing an ad on the GraffitiWall™. The system can identify targeted members by matching the consumer's handle with the consumer's demographics, stored on the database server, shown at 10 in FIG. 1, and only displaying information about the focus groups to members with the desired characteristics.

If the consumer proceeds to step S158, Focus Groups, the consumer is presented with a multiple-choice questionnaire in the form of a pop up window. For example, the consumer may be asked whether the consumer regards a swimsuit as a fashion statement, lingerie, or a utilitarian article of clothing. The form must be completed in order for the consumer to proceed further. Subsequently, a series of pop up windows display product lines, packaging concepts, tag lines, print ads, televisions ads, radio ads, and the like. For example, the consumer may be presented with four different bathing suits and asked to select the one the consumer would purchase. The consumer can use a text box to add commentary explaining the consumer's choice.

A focus group can be presented privately as a one-on-one endeavor, in which case each consumer can respond at his or her convenience, or as a real-time/live, group endeavor. Live focus groups are scheduled and the sponsor provides a moderator. The moderator moves the group along by providing a sequence of chat screens. The system saves the content of chat screens for later review by the sponsor. If a participant doesn't complete a session, an error message pop up directs the participant back to the session or to the GraffitiWall Main Menu™. When a focus group session ends, participants receive a thank you and the aggregate results are displayed.

If the consumer proceeds to step S160, Sales and Promotions, the consumer can view information on new products and print out discount coupons. Sales and promotion events are publicized on the GraffitiWall™.

If the consumer proceeds to step S162, Guest Hosts, the consumer can participate in a chat led by one or more prominent entertainers, models, or other well-known public figures. For example, a well-known super model could host a lingerie fashion show contest. Participants would use clip art of lingerie from a popular brand to dress a virtual model. A silent moderator would guide the chat's direction.

If the consumer proceeds to step S164, Special Events and Games, the consumer can participate, for example, in online scavenger hunts for promotional items hidden on the GraffitiWall™ using clues provided by the sponsor. In step S180, the consumer may move to a virtual "room," (hyperlink), to participate in an activity, when more than one game or event is simultaneously featured.

In step S166, logged in members can experience an online tour, learning the best features of the GraffitiWall™ and how to take advantage of them. In step S168, members can review a list of FAQs developed from chats and emails. In step S170, member rules of behavior are listed, together with the penalties for breaking them.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A networked interactive system for display of product information to a plurality of consumers, comprising:
   a. a multimedia forum for enabling the consumers to communicate in a plurality of modes with each other and at least one sponsor associated with a brand related to the product information; and
   b. a multimedia interface for enabling the consumers to modify and view the product information;
   wherein the consumer can edit the product information using graphics tools, the consumer's modification to the product information is stored as a series of instructions, a history of the modifications to the multimedia interface by the consumer is stored, enabling the system to recreate the multimedia interface in its previous formats, and the product information and the multimedia interface are updated based upon the consumers' actions and communicated to the sponsor.

2. A system as recited by claim 1, wherein the consumers communicate via a focus group.

3. A system as recited by claim 2, wherein the focus group interaction is real time and led by a moderator.

4. A system as recited by claim 2, wherein the focus group interaction comprises question and answer sessions.

5. A system as recited by claim 1, wherein the product information comprises images stored as vector graphics.

6. A system as recited by claim 1, wherein the consumer interacts with the system via a Web browser.

7. A system as recited by claim 1, wherein the product information is encoded in an active server page (ASP).

8. A system as recited by claim 1, wherein the multimedia interface is customized by a system administrator to reflect each consumer's interests.

9. A system as recited by claim 1, wherein the system comprises at least one database server connected to at least one product information server, the at least one product information server being connected to at least one client workstation.

10. A system as recited by claim 9, wherein said client workstation software comprises at least one of the following: an Active X control, a Java Applet or a Shockwave Movie.

11. A system as recited by claim 9, wherein consumer interaction with the multimedia forum is distributed among a plurality of product information servers.

12. A system as recited by claim 9, wherein the consumers can rate the multimedia interface and portions thereof, their ratings being stored in the database server.

13. A system as recited by claim 9, wherein the client workstation is a personalized digital assistant (PDA).

14. The system as claimed in claim 9, wherein the client workstation is a kiosk.

15. A system as recited by claim 1, wherein the consumer can add multimedia product information to the system.

16. A system as recited by claim 1 or 15, wherein the product information is interchangeable, enabling the system to be utilized with a plurality of brands.

17. A system as recited by claim 1 or 15, wherein the system has a system administrator, and the system administrator can control:
   a. a length and width of the multimedia interface presented to the consumer;
   b. a length of time the consumer modifications persist;
   c. consumer access to the system;
   d. promotions and prizes distributed through the multimedia forum;
   e. a schedule of focus groups, interviews, and chats enabled through the multimedia interface;
   f. a mailing list of consumers accessing the system; and
   g. consumer assistance.

18. A system as recited by claim 1 or 15, wherein the sponsor can configure the multimedia interface and generate reports based on information stored in the database server.

19. A system as recited by claim 1, further comprising a chat feature.

20. A system as recited by claim 1, wherein the system is customized to reflect the interests of a group of consumers.

21. A system as recited by claim 1, wherein the system can generate a snapshot of the multimedia interface in a format which can be emailed.

22. A system as recited by claim 1, wherein system information comprising consumer profile data, multimedia product information, and consumer responses is stored in a relational database.

23. A system as recited by claim 1, wherein at least one of the modes is available to the customers at substantially any time.

24. A system as recited by claim 1, wherein the plurality of modes comprises a create mode, a rate mode, an interact mode, a send mode, a focus group/feedback mode, and a help mode.

25. A system as recited by claim 1, further comprising at least one of an administrative control panel and a client control panel, whereby a system administrator of the system can control:
   a. a length and width of the multimedia interface presented to the consumer;
   b. a length of time the consumer modifications persist;
   c. consumer access to the system;
   d. promotions and prizes distributed through the multimedia forum;
   e. a schedule of focus groups, interviews, and chats enabled through the multimedia interface;
   f. a mailing list of consumers accessing the system; and
   g. consumer assistance.

26. A system as recited by claim 1, wherein the brand is associated with a single sponsor.

27. A method for displaying product information to a plurality of consumers in a networked interactive system, comprising the steps of:
   a. connecting the consumers and at least one sponsor associated with a brand related to the product information so that they can communicate with each other in a multimedia forum in a plurality of modes;
   b. providing a multimedia interface to the consumers with which the consumers can modify and view the product information and edit the product information using graphics tools, the consumer's modifications to the product information being stored as a series of instructions and a history of the modifications to the multimedia interface by the consumer being stored, enabling the system to recreate the multimedia interface in its previous formats;
   c. updating the product information and the multimedia interface based upon the consumers' actions; and
   d. communicating the updating to the sponsor.

28. A method as recited by claim 27, wherein the consumers communicate via a focus group.

29. A method as recited by claim 28, wherein the focus group interaction is real time and led by a moderator.

30. A method as recited by claim 28, wherein the focus group interaction comprises question and answer sessions.

31. A method as recited by claim 27, wherein the product information comprises images stored as vector graphics.

32. A method as recited by claim 27, wherein the consumer interacts with the system via a Web browser.

33. A method as recited by claim 27, wherein the product information is encoded in an active server page (ASP).

34. A method as recited by claim 27, wherein the multimedia interface is customized by a system administrator to reflect each consumer's interests.

35. A method as recited by claim 27, wherein the system comprises at least one database server connected to at least one product information server, the product information server being connected to at least one client workstation.

36. A method as recited by claim 35, wherein the client workstation software comprises at least one of the following: an Active X control, a Java Applet or a Shockwave Movie.

37. A method as recited by claim 35, wherein consumer interaction with the multimedia forum is distributed among a plurality of product information servers.

38. A method as recited by claim 35, wherein the consumers can rate the multimedia interface and portions thereof, their ratings being stored in the database server.

39. A method as recited by claim 35, wherein the client workstation is a personal digital assistant (PDA).

40. A method as recited by claim 35, wherein the client workstation is a kiosk.

41. A method as recited by claim 27, wherein the consumer can add multimedia product information to the system.

42. A method as recited by claim 27 or 41, wherein the system has a system administrator, who can control:
   a. a length and width of the multimedia user interface presented to the consumer;
   b. a length of time the consumer modifications persist;
   c. user access to the system;
   d. promotions and prizes distributed through the multimedia forum;
   e. a schedule of focus groups enabled through the multimedia interface;
   f. a mailing list of consumers accessing the system; and
   g. consumer assistance.

43. A system as recited by claim 27 or 41, wherein the sponsor can configure the multimedia interface and generate reports based on information stored in the database server.

44. A method as recited by claim 27, wherein the sponsor has a representative and the method further comprises providing a chat feature wherein the consumers and the sponsor's representative can communicate real time.

45. A method as recited by claim 27, wherein the system is customized to reflect the interests of a group of consumers.

46. A method as recited by claim 27, wherein the system can generate a snapshot of the multimedia user interface in a format, which can be emailed.

47. A method as recited by claim 27, wherein the product information is interchangeable enabling the system to be utilized with a plurality of brands.

48. A method as recited by claim 27, wherein system information comprising consumer profile data, multimedia product information, and consumer responses is stored in a relational database.

49. A method for displaying product information to a plurality of consumers in a networked interactive system, comprising:
   a. means for connecting the consumers and at least one sponsor associated with a brand related to the product information so that they can communicate in a plurality of modes with each other in a multimedia forum;
   b. means for providing a multimedia interface to the consumers with which the consumers can modify and view the product information using graphics tools;
   c. means for storing the consumers' modifications to the product information and the history of the modifications, whereby the system is enabled to recreate the multimedia interface in its previous formats;
   d. means for updating the product information and the multimedia interface based upon the consumers' actions; and
   e. means for communicating the updating to the sponsor.

50. Computer-executable process steps for displaying product information to a plurality of consumers in a networked interactive system, the computer-executable process steps being stored on a computer-readable medium comprising:
   a. a connecting step for connecting the consumers and at least one sponsor associated with a brand related to the product information so that they can communicate in a plurality of modes with each other in a multimedia forum;
   b. a presentation step for providing a multimedia interface to the consumers with which the consumers can modify and view the product information, the interface including graphics tools and storage of the consumer's modifications to the product information as a series of instructions;
   c. an updating step for updating the product information and the multimedia interface based upon the consumers' actions and storing a history of the modifications to the multimedia interface by the system, whereby the system is enabled to recreate the multimedia interface in its previous formats; and
   d. a communicating step for communicating the updating to the sponsor.

* * * * *